(12) United States Patent
Brenner et al.

(10) Patent No.: US 9,603,193 B2
(45) Date of Patent: Mar. 21, 2017

(54) ELECTRICALLY HEATED THERMOSTATIC WORKING ELEMENT

(75) Inventors: Shai Brenner, Haifa (IL); Eli Elkayam, Kibutz Yehiam (IL)

(73) Assignee: M.A.P. MOTORAD AUTOMOTIVE PARTS LTD., Misgav (IL)

( * ) Notice: Subject to any disclaimer, the term of this patent is extended or adjusted under 35 U.S.C. 154(b) by 1007 days.

(21) Appl. No.: 13/703,769

(22) PCT Filed: Jun. 15, 2011

(86) PCT No.: PCT/IL2011/000475
§ 371 (c)(1),
(2), (4) Date: Jul. 8, 2013

(87) PCT Pub. No.: WO2011/158235
PCT Pub. Date: Dec. 22, 2011

(65) Prior Publication Data
US 2013/0306624 A1 Nov. 21, 2013

(51) Int. Cl.
*H05B 3/44* (2006.01)
*H05B 3/50* (2006.01)
*H05B 3/02* (2006.01)
*H05B 1/02* (2006.01)
(Continued)

(52) U.S. Cl.
CPC ............ *H05B 1/02* (2013.01); *F03G 7/06* (2013.01); *G05D 23/1921* (2013.01); *Y10T 29/49083* (2015.01)

(58) Field of Classification Search
USPC ........................................................ 60/527
See application file for complete search history.

(56) References Cited

U.S. PATENT DOCUMENTS 3,711,060 A * 1/1973 Weinstein .......... G05D 23/1921
   137/468
3,805,023 A * 4/1974 Wainer .................... C25D 5/02
   106/1.13
(Continued)

FOREIGN PATENT DOCUMENTS

DE 4030383 4/1992
DE 4233913 4/1994
EP 0139586 5/1985

OTHER PUBLICATIONS

ISR of PCT/IL11/00475 mailed Nov. 30, 2011.

*Primary Examiner* — David Angwin
*Assistant Examiner* — Gyounghyun Bae
(74) *Attorney, Agent, or Firm* — The Roy Gross Law Firm, LLC; Roy Gross

(57) ABSTRACT

There is provided a thermostatic working element comprising: a housing for receiving an expansion medium; an electric heating element arranged in the housing and provided with connecting lines, wherein a base of a bottom side of the housing comprises an opening for passage therethrough of the connecting lines; and a gasket disposed between the electric heating element and the base of the bottom side of the housing, essentially surrounding the opening, wherein the housing further comprises a recess located in proximity to the electric heating element, configured to press the electric heating element and the gasket against the base of the bottom side of the housing and thereby sealing of the housing is facilitated.

9 Claims, 1 Drawing Sheet

(51) Int. Cl.
  *F03G 7/06* (2006.01)
  *G05D 23/19* (2006.01)

(56) References Cited

U.S. PATENT DOCUMENTS

| | | | | |
|---|---|---|---|---|
| 4,025,755 A * | 5/1977 | Shirley | ............... | G05D 23/275 200/302.1 |
| 4,053,136 A * | 10/1977 | Perl | ....................... | F23N 5/047 236/101 E |
| 4,083,336 A * | 4/1978 | Armstrong | ........... | H05B 1/0213 219/505 |
| 4,213,029 A * | 7/1980 | Endicott, Jr. | ............ | H01Q 1/02 114/340 |
| 4,558,206 A * | 12/1985 | Ball | ....................... | E21B 36/00 137/341 |
| 4,666,081 A * | 5/1987 | Cook | ..................... | F01P 7/167 236/34.5 |
| 4,685,651 A | 8/1987 | Nouvelle | | |
| 5,020,325 A * | 6/1991 | Henault | .................... | F03G 7/06 60/527 |
| 5,452,852 A * | 9/1995 | Marckel | .................. | F01P 11/16 137/75 |
| 5,883,365 A | 3/1999 | Saur | | |
| 2001/0019081 A1 * | 9/2001 | Mabboux | ................ | F01P 7/167 236/34.5 |
| 2002/0017518 A1 * | 2/2002 | Danko | ..................... | H05B 1/02 219/536 |
| 2006/0113399 A1 * | 6/2006 | Maraux | ................... | F01P 7/167 236/93 R |
| 2006/0237440 A1 * | 10/2006 | Gadini | ..................... | F03G 7/06 219/507 |
| 2009/0218530 A1 * | 9/2009 | Starck | ................... | G05D 23/1921 251/11 |
| 2010/0230399 A1 * | 9/2010 | Pottie | .................. | G05D 23/022 219/482 |

* cited by examiner

ELECTRICALLY HEATED THERMOSTATIC WORKING ELEMENT

FIELD OF THE INVENTION

Embodiments of the invention are related to a heated thermostatic working element configure to receive an electric heating element.

BACKGROUND

Thermostatic working elements are used in various systems, for example, in vehicles' cooling systems. Thermostatic working elements are used particularly with a thermostatic valve. Electrically heated thermostatic working elements are known in the prior art, for example in U.S. Pat. No. 4,685,651, in which an opening of the bottom of the housing is closed by means of a base made of plastic which surrounds the connecting lines of the heating element and through which the connecting lines are guided to the outside. The base is produced as a separate component. It is inserted from the outside into an opening of the housing having a ring shoulder with the interposition of a sealing ring and is held by means of a flanging of the outer edge of the opening.

Other type of electrically heated, thermostatic working element are described, for example, in U.S. Pat. No. 5,883,365, wherein the base is injected molded into the opening of the bottom of the housing, such that the base is already mounted when it is manufactured without requiring any additional mounting operations for bringing in and adapting the base.

Still, assembling the thermostatic working element, while allowing exit of connecting lines of the electric heating element and sealing of the housing against an emerging of the expansion medium, is complicated, particularly in view of the high pressure that is created in the housing during operation of the thermostat. There is thus a need in the art for simple and efficient electrically heated thermostatic working elements that could overcome these problems.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

Embodiments of the invention relate to a thermostatic working element comprising:

a housing for receiving an expansion medium;

an electric heating element having an anchoring element, wherein the electric heating element is arranged in the housing and provided with connecting lines, the base of the bottom side of the housing including an opening for passage therethrough of the connecting lines (and optionally a part of the electric heating element); and a gasket (for example, having a shape of a torus, for example an O ring) disposed between the anchoring element and the base of the bottom side of the housing, surrounding the opening, wherein the housing further includes a circumferential recess located in proximity to the top of the anchoring element, the recess is formed by applying circumferential (such as, essentially ring like) pressured which compresses the walls of the housing inwardly, thus the anchoring element and the gasket are pressed against the base of the bottom side of the housing and thereby sealing of the housing is facilitated.

There is further provided herein, according to some embodiments, a process of manufacturing the electrically heated thermostatic working element. The process may include:

inserting to a housing of an electrically heated thermostatic working element a gasket and an electric heating element having anchoring element forming a circumferential recess in a wall of the housing, in proximity to the location of the top of the anchoring element inside the housing, thereby pushing the wall of the housing inwardly, pressing the anchoring element and the gasket against the base at the bottom of the housing and thereby facilitating the sealing of the housing;

inserting to a housing an expansion medium, and a membrane for receiving a working piston.

According to some embodiments, there is provided a thermostatic working element comprising: a housing for receiving an expansion medium; an electric heating element arranged in the housing and optionally provided with connecting lines, wherein a base of a bottom side of the housing comprises an opening for passage therethrough of the connecting lines; and a gasket disposed between the electric heating element and the base of the bottom side of the housing, essentially surrounding the opening, wherein the housing further comprises a recess located in proximity to the electric heating element, configured to press the electric heating element and the gasket against the base of the bottom side of the housing and thereby sealing of the housing is facilitated.

According to some embodiments, the electric heating element comprises an anchoring element configured to stabilize the electric heating element within the housing and to prevent the pulling thereof out of the opening, wherein the gasket is disposed between the anchoring element and the base of the bottom side of the housing, surrounding the opening, and wherein the recess is located in proximity to the top of the anchoring element, configured to press the anchoring element and the gasket against the base of the bottom side of the housing.

According to some embodiments, there is provided a process of manufacturing an electrically heated thermostatic working element, the process comprising: inserting to a housing of an electrically heated thermostatic working element a gasket and an electric heating element; forming a recess in a wall of the housing, in proximity to the location of the electric heating element inside the housing, thereby pushing the wall of the housing inwardly, pressing the electric heating element and the gasket against the base at the bottom of the housing and thereby facilitating the sealing of the housing.

According to some embodiments, the electric heating element comprises an anchoring element configured to stabilize the electric heating element within the housing and to prevent the pulling thereof out of the opening, wherein forming the circumferential recess in the wall of the housing, is performed in proximity to the location of the top of the anchoring element inside the housing, thereby pushing the wall of the housing inwardly, pressing the anchoring element and the gasket against the base at the bottom of the housing and thereby facilitating the sealing of the housing.

According to some embodiments, the process further comprising inserting to the housing an expansion medium, and a membrane configured to receive a working piston. According to some embodiments, the process further comprising covering with a cap a top side of the housing and bending the edge of the top side of the housing over the edge of the cap or bending the edge of the cap over the edge of the top side of the housing.

According to some embodiments, the anchoring element is an integral part of the electric heating element. According to some embodiments, the anchoring element and the electric heating element are separately formed.

According to some embodiments, the recess is a circumferential recess. According to some embodiments, the recess is formed by applying circumferential (such as, essentially ring like) pressure which compresses the walls of the housing inwardly.

According to some embodiments, the gasket has essentially a shape of a torus. According to some embodiments, the gasket is an O ring.

According to some embodiments, the opening is configured for passage therethrough of the connecting lines and optionally a part of the electric heating element.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. It is intended that the embodiments and figures disclosed herein are to be considered illustrative rather than restrictive. The figures are listed below.

DETAILED DESCRIPTION

Figures 1, 2:
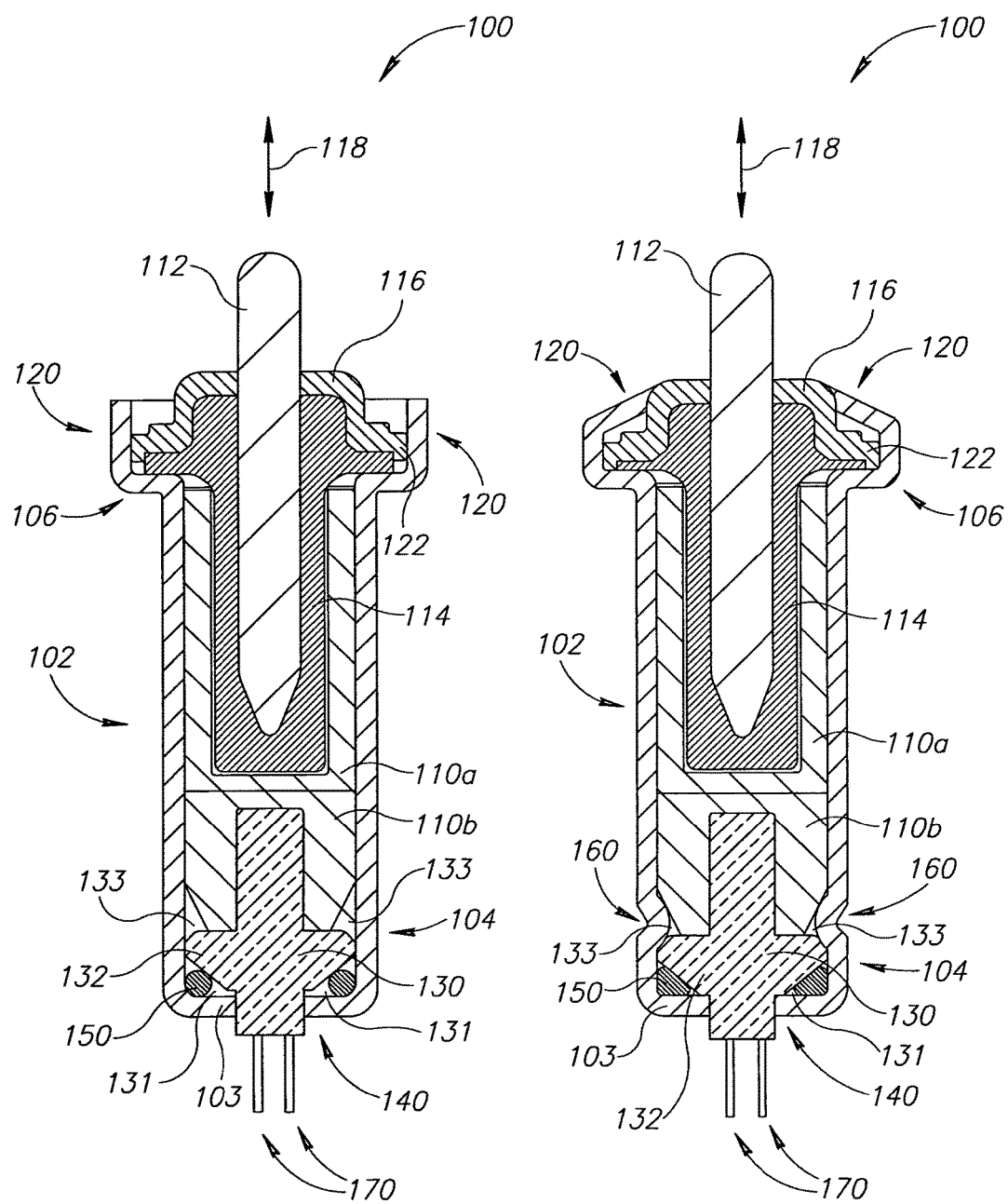
FIG. 1 shows a cross-section of a thermostatic working element, according to some embodiments of the invention.
FIG. 2 shows a cross-section of the thermostatic working element of FIG. 1, according to some embodiments of the invention.

Reference is now made to FIG. 1, which shows a cross-section of a thermostatic working element and to FIG. 2, which shows a cross-section of the thermostatic working element of FIG. 1, according to some embodiments of the invention.

FIGS. 1 and 2 illustrate cross-sections of the thermostatic working element 100 in a first stage configuration (assembled) and in a second stage configuration (tightened) respectively. Thermostatic working element 100 generally includes a housing 102, typically made of a heat conductive metal such as copper, aluminum or various metal alloys. Housing 102 is shown herein to be a one-piece element which includes two sides: a bottom side 104, which is generally in the shape of a cylinder and is generally closed, and a top side 106, which is generally opened.

It is noted herein that the scope of this disclosure also covers the bi-component housing as described in a concurrently filed USP application by the same applicant and which is entitled: "Thermostatic working element" and which is enclosed herein as reference in its entirety.

Housing 102 is configured to accommodate an expansion medium 110, for example, a wax mixture which, in a temperature range which can be defined by the mixture, changes its volume and drives out a working piston 112. Working piston 112 is partially positioned within a membrane 114 (in this case a bag-type membrane) which is disposed in expansion medium 110. It is noted that other configurations of a membrane (such as a disc shape membrane) are also covered under the scope of this disclosure, in which case the expansion of expending medium 110 directly drives out working piston 112. According to some embodiments, expansion medium 110 may be divided into two parts 110a and 110b.

The top side 106 of housing 102 may be wider (however, not necessarily) in diameter than bottom side 104 and is configured to be closed by a cap 116 which has a shape of a short cylinder having an edge (rim) 122 which is opening sideways (generally forming a shape of a cap or a hat). Cap 116 is also configured to guide a working piston 112 in its position and to enable the movement of working piston 112 up and down (see arrow 118) in the direction parallel to the length of bottom side 104 of housing 102.

In operation, when the temperature increases (exceeds a predetermined value) in proximity to housing 102 of thermostatic working element 100, heat is conducted by housing 102 to expansion medium 110. Expansion medium 110 expends, presses against membrane 114 and pushes working piston 112 out (for example, in order to open a valve).

In manufacturing of thermostatic working element 100, edge 120 of top side 106 of housing 102 (shown in FIG. 1 to be parallel to the length of bottom side 104) are bent over edge 122 of cap 116 (as shown in FIG. 2), such that cap 116 is held in place and cannot be removed from its position as closing means of top side 106 of housing 102.

Electric heating element 130 is arranged inside housing 102 such that it is positioned in expansion medium 110 (for example in a bottom part of expansion medium 110, 110b) and partially extending outside of housing 102 through a (bottom) opening 140 in a base 103 of bottom side 104.

Two connecting lines 170 are connected to electric heating element 130 and are guided to the outside through opening 140 in base 103 of bottom side 104 of housing 102.

Electric heating element 130 may include (or be connected to or formed with) an anchoring element 132 which is configured to stabilize the electric heating element within housing 102, prevent its pulling out of opening 140 and assist in sealing housing 102 against an emerging of the expansion medium. Anchoring element 132 extends from the bottom of the expansion medium 110 (shown herein as bottom part 110b of expansion medium 110) to base 103, forming first circumferential space 131 (FIG. 1) between the bottom of anchoring element 132, the edges of base 103 and the bottom part of the walls of bottom side 104 (for the positioning of gasket 150, see below). First circumferential space 131 (as shown in FIG. 1) has a triangular cross section (but can have any other shape, such as circular, elliptic, etc.) created between the bottom of anchoring element 132, the edges of base 103, and the bottom part of the walls of bottom side 104 of housing 102.

Anchoring element 132 further forms a second circumferential space 133 (as shown in FIG. 1) between the top of anchoring element 132, the bottom of the expansion medium 110 (shown herein as bottom part 110b of expansion medium 110) and the wall of bottom side 104 (in proximity to the connection between the top of anchoring element 132 and the bottom of the expansion medium 110). Second circumferential space 133 (as shown in FIG. 1) has a triangular cross section created between the top of anchoring element 132, the bottom of the expansion medium 110

(shown herein as bottom part 110b of expansion medium 110) and the wall of bottom side 104.

Housing 102 includes a gasket 150, generally having a shape of a torus and may from an elastic material (for example an O ring). Gasket 150 is positioned between anchoring element 132 and base 103 of bottom side 104, surrounding opening 140. As discussed above, there may still be a problem of sealing the housing which has received the electric heating element against an emerging of the expansion medium, particularly in high pressures. Thus, to solve this problem, according to embodiments of the invention, bottom side 104 of housing 102 further includes a recess 160, which is an essentially circumferential recess located in proximity to the connection between the top of anchoring element 132 and the bottom of the expansion medium 110. Recess 160 pushes the walls of bottom side 104 (in proximity to the connection between the top of anchoring element 132 and the bottom of the expansion medium 110) inwardly towards the center of the cylinder, such that second circumferential space 133 is minimized (as shown in FIG. 2). As also shown in FIG. 2, recess 160 presses anchoring element 132 against base 103, minimizes the first circumferential space 131, presses gasket 150 and seals housing 102.

The electrically heated thermostatic working element structure as disclosed herein, according to embodiments of the invention, allows the insertion of an electric heating element to the housing and the sealing of the housing against an emerging of the expansion medium in high pressures, while allowing the exit of connecting lines.

Furthermore, the process for the manufacturing of the electrically heated thermostatic working element structure, according to embodiments of the invention, is simple and does not require complicated sealing processes such as injection molding. According to embodiments, the process of manufacturing the electrically heated thermostatic working element structure may include:

insertion of gasket 150 and electric heating element 130 having anchoring element 132 (for example, through opened top side 106) to housing 102;

forming recess 106 (as shown in FIG. 2);

insertion of expansion medium 110; membrane 114 and working piston 112;

covering top side 106 of housing 102 with cap 116; and bending edge 120 of top side 106 of housing 102 over edge 122 of cap 116 (as shown in FIG. 2).

What we claim is:

1. A thermostatic working element comprising:
a housing for receiving an expansion medium;
an electric heating element having an anchoring element with a top side and a bottom side arranged at a lower portion of said electric heating element, said electric heating element being arranged in the housing;
connecting lines connected to said electric heating element, wherein a base of a bottom side of the housing comprises an opening for passage therethrough of said connecting lines; and
a gasket disposed between the bottom side of said anchoring element of said electric heating element and the base of the bottom side of the housing, essentially surrounding the opening,
wherein the top side of said anchoring element is bent inwardly toward the top of said heating element to form a circumferential engagement surface,
wherein the housing further comprises a recess formed by applying circumferential pressure which compress the walls of the housing inwardly, and located in proximity to the electric heating element at the top side of said anchoring element, and
wherein the recess is configured to press against the circumferential engagement surface of the anchoring element thereby pressing the anchoring element downwardly against the gasket and the base of the bottom of the housing, forming a seal of the housing by the bottom side thereof.

2. The thermostatic working element of claim 1, wherein the anchoring element is configured to stabilize the electric heating element within the housing and to prevent the pulling thereof out of the opening, wherein the gasket is disposed between the anchoring element and the base of the bottom side of the housing, surrounding the opening, and wherein the recess is located in proximity to the top of the anchoring element, configured to press the anchoring element and the gasket against the base of the bottom side of the housing.

3. The thermostatic working element of claim 1, wherein the recess is a circumferential recess.

4. The thermostatic working element of claim 1, wherein the gasket has essentially a shape of a torus.

5. The thermostatic working element of claim 1, wherein the gasket is an 0 ring.

6. The thermostatic working element of claim 1, wherein the opening is configured for passage therethrough of the connecting lines and a part of the electric heating element.

7. The thermostatic working element of claim 1, wherein the recess is formed by applying circumferential pressured which compresses the walls of the housing inwardly.

8. The thermostatic working element of claim 2, wherein the anchoring element is an integral part of the electric heating element.

9. The thermostatic working element of claim 2, wherein the anchoring element and the electric heating element are separately formed.

* * * * *